(12) United States Patent
Yamada et al.

(10) Patent No.: US 11,319,237 B2
(45) Date of Patent: May 3, 2022

(54) GLASS MATERIAL MANUFACTURING METHOD AND GLASS MATERIAL MANUFACTURING DEVICE

(71) Applicant: NIPPON ELECTRIC GLASS CO., LTD., Otsu (JP)

(72) Inventors: Tomoko Yamada, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 415 days.

(21) Appl. No.: 16/297,771

(22) Filed: Mar. 11, 2019

(65) Prior Publication Data

US 2019/0202725 A1    Jul. 4, 2019

Related U.S. Application Data

(62) Division of application No. 15/316,586, filed as application No. PCT/JP2015/069458 on Jul. 6, 2015, now Pat. No. 10,773,987.

(30) Foreign Application Priority Data

Jul. 14, 2014  (JP) .................................. 2014-143809
Jul. 23, 2014  (JP) .................................. 2014-149619
Mar. 31, 2015 (JP) .................................. 2015-072369
May 26, 2015 (JP) .................................. 2015-106105

(51) Int. Cl.
  *C03B 5/235*    (2006.01)
  *C03B 19/10*   (2006.01)
  *C03B 23/00*   (2006.01)
  *C03B 40/04*   (2006.01)
  *C03B 19/06*   (2006.01)

(52) U.S. Cl.
  CPC .......... *C03B 5/235* (2013.01); *C03B 19/1005* (2013.01); *C03B 23/00* (2013.01); *C03B 40/04* (2013.01); *C03B 19/063* (2013.01)

(58) Field of Classification Search
  CPC ....... C03B 40/04; C03B 5/235; C03B 19/063; C03B 23/00; C03B 19/1005
  See application file for complete search history.

(56) References Cited

U.S. PATENT DOCUMENTS

2006/0205095 A1* 9/2006 Yono .................. C03C 4/00
                                                    438/2

OTHER PUBLICATIONS

Yamada et al., "Glass Material Manufacturing Method and Glass Material Manufacturing Device", U.S. Appl. No. 15/316,586, filed Dec. 6, 2016.

* cited by examiner

*Primary Examiner* — Dana Ross
*Assistant Examiner* — Kuangyue Chen
(74) *Attorney, Agent, or Firm* — Keating and Bennett, LLP

(57) ABSTRACT

Provided is a method that can manufacture a glass material having excellent homogeneity by containerless levitation. With a block (12) of glass raw material held levitated above a forming surface (10*a*) of a forming die (10) by jetting gas through a gas jet hole (10*b*) opening on the forming surface (10*a*), the block (12) of glass raw material is heated and melted by irradiation with laser beam, thus obtaining a molten glass, and the molten glass is then cooled to obtain a glass material. Control gas is jetted to the block (12) of glass raw material along a direction different from a direction of jetting of the levitation gas for use in levitating the block (12) of glass raw material or the molten glass.

5 Claims, 20 Drawing Sheets

[Fig. 1]
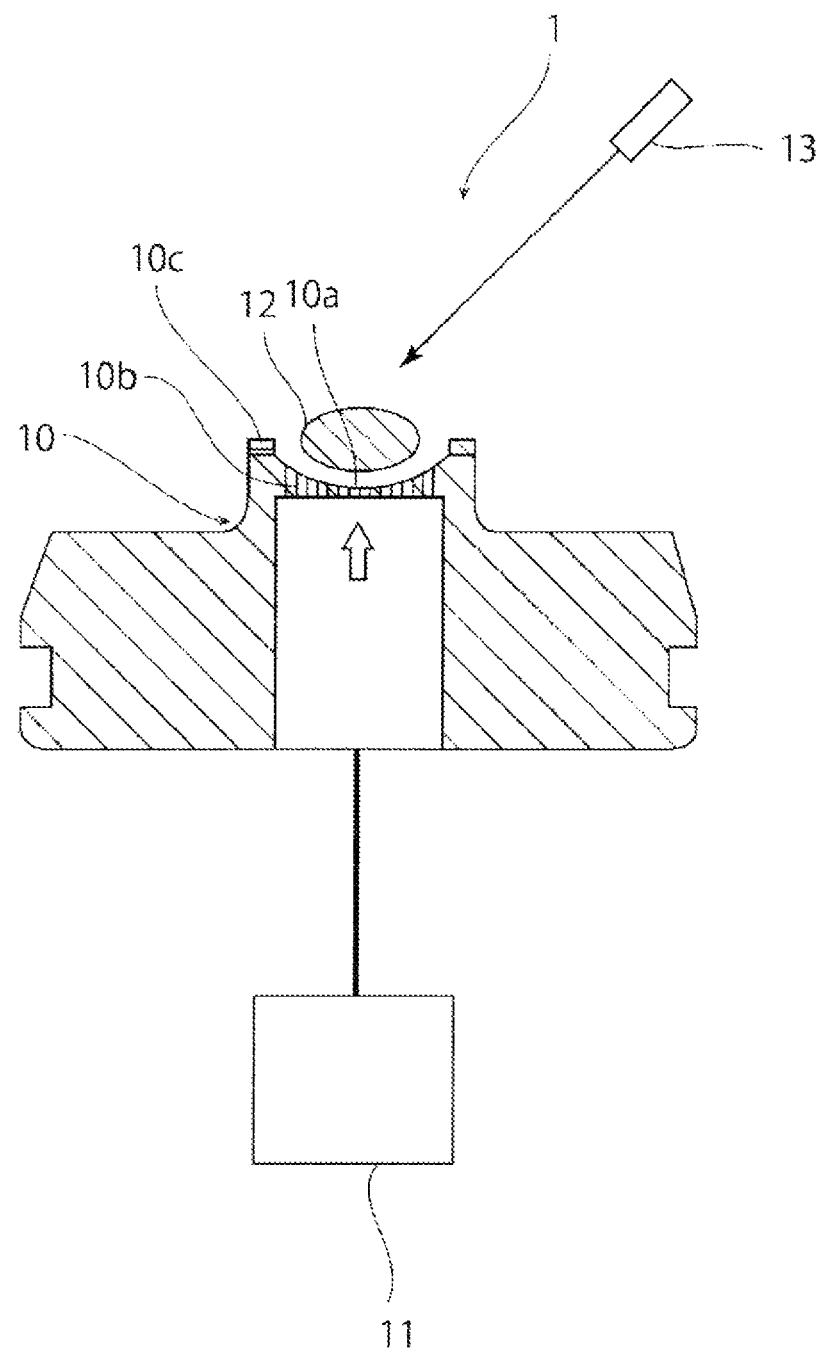

[Fig. 2]
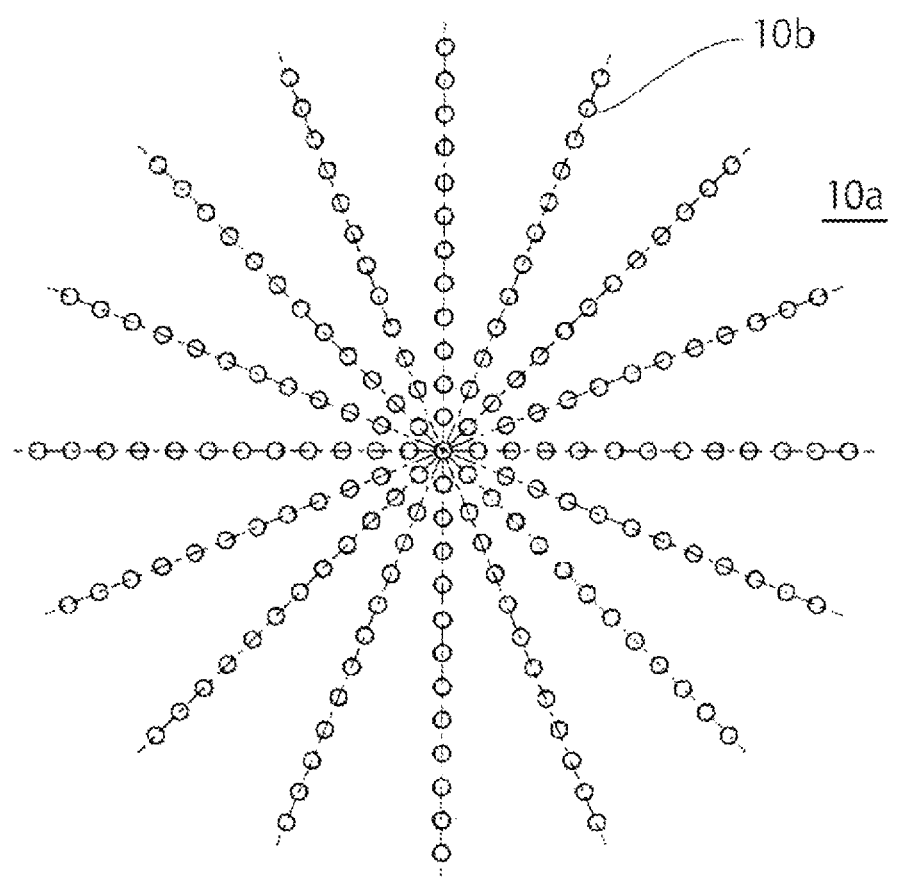

[Fig. 3]
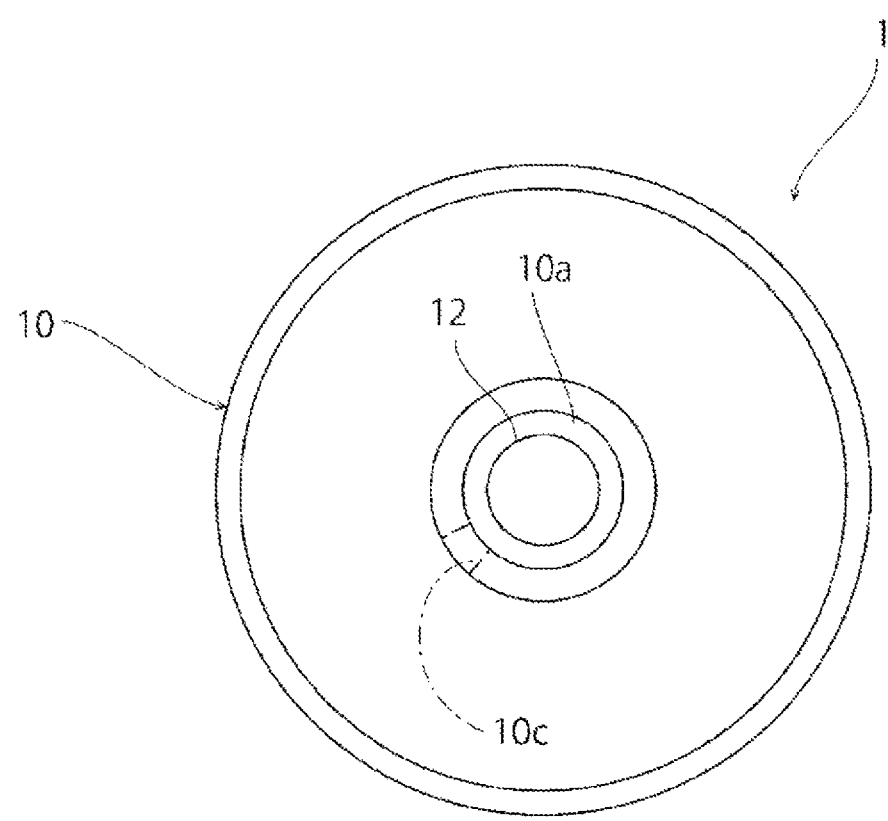

[Fig. 4]
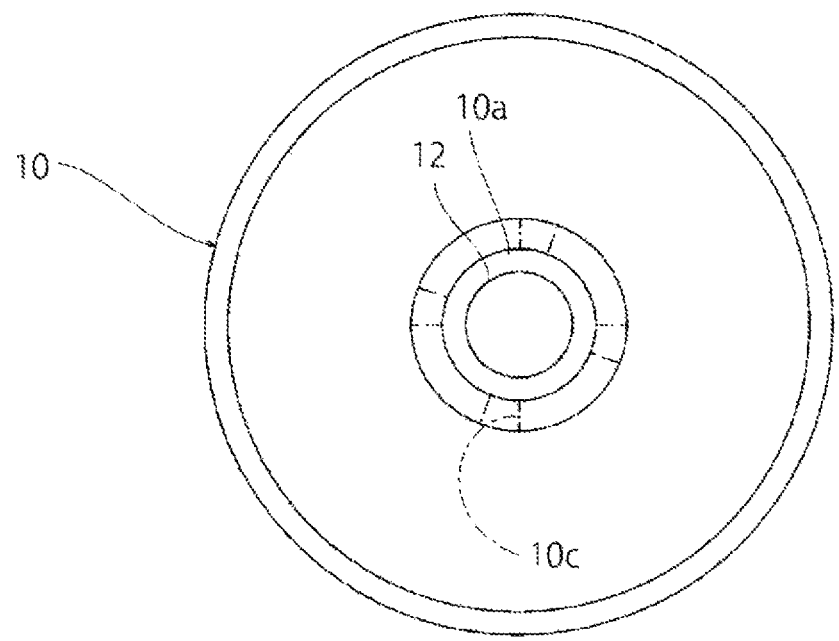

[Fig. 5]
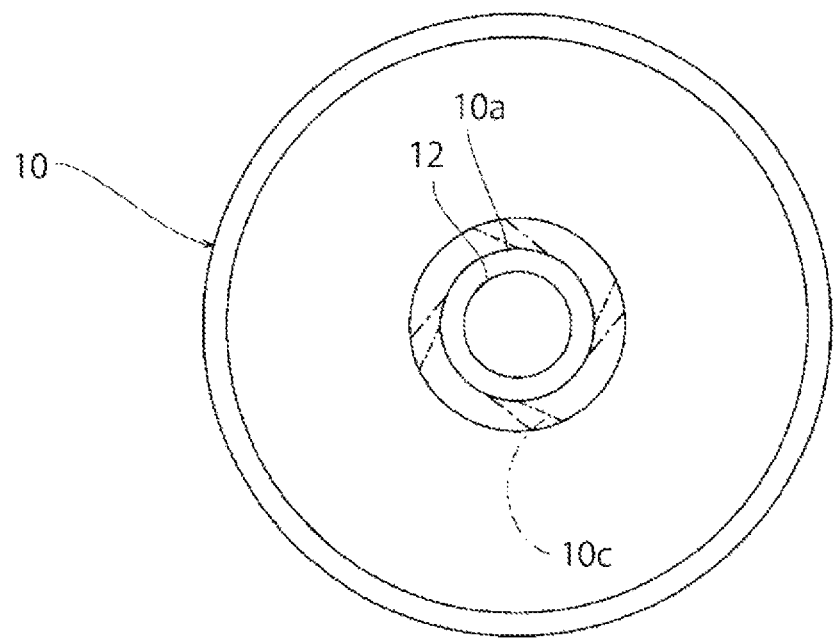

[Fig. 6]
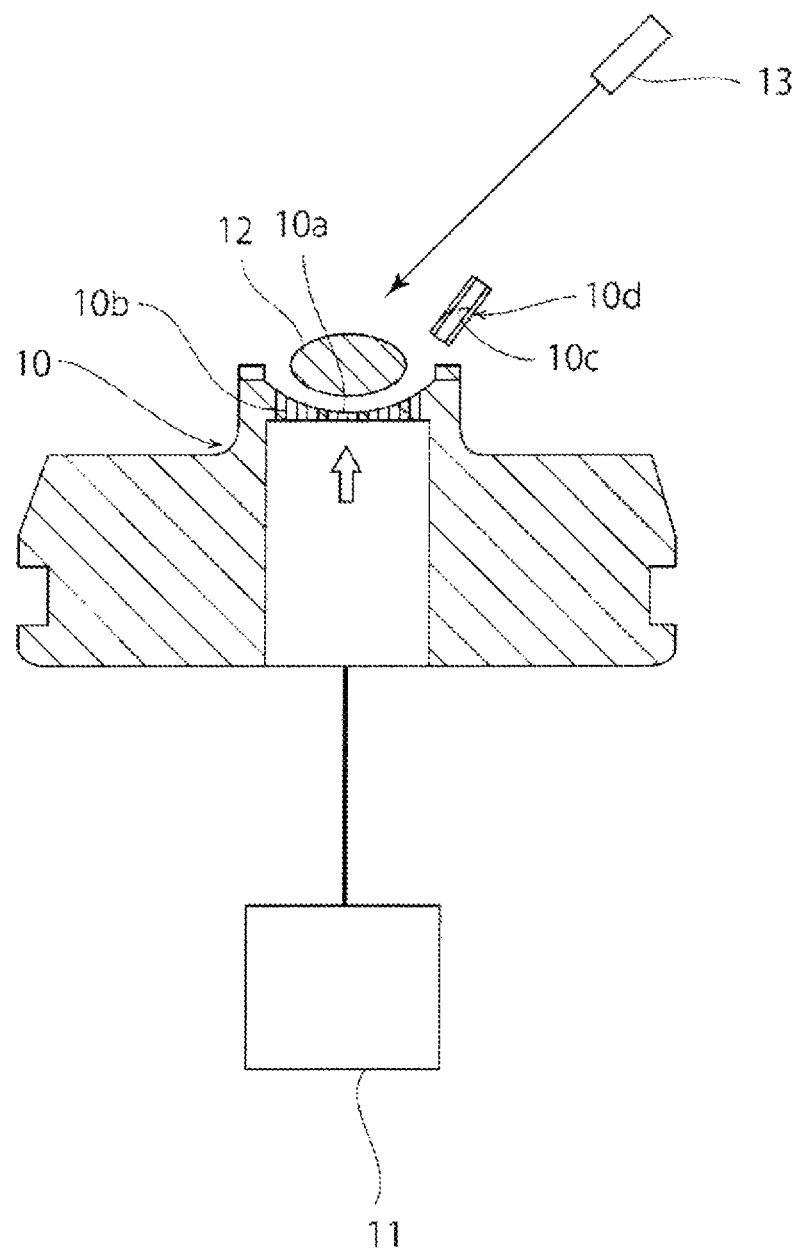

[Fig. 7]
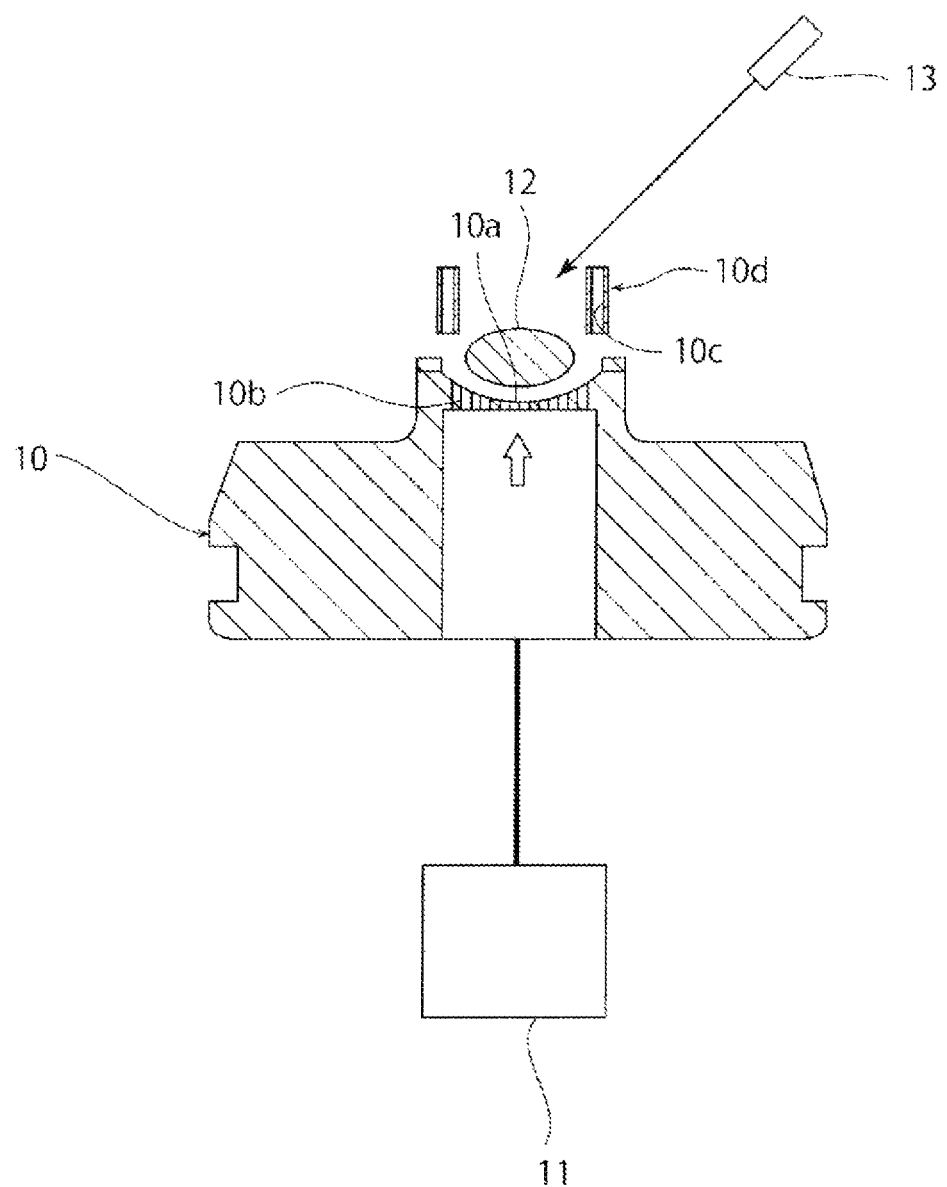

[Fig. 8]
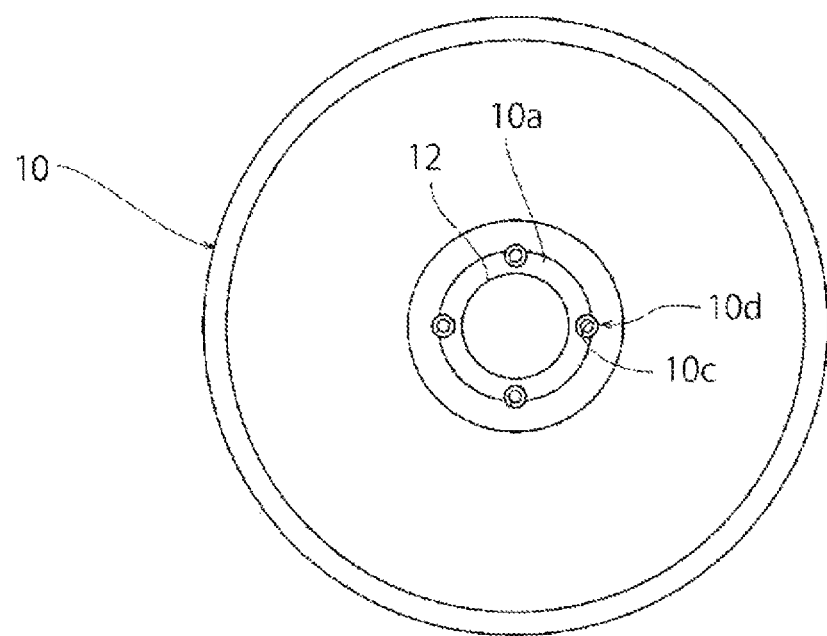

[Fig. 9]
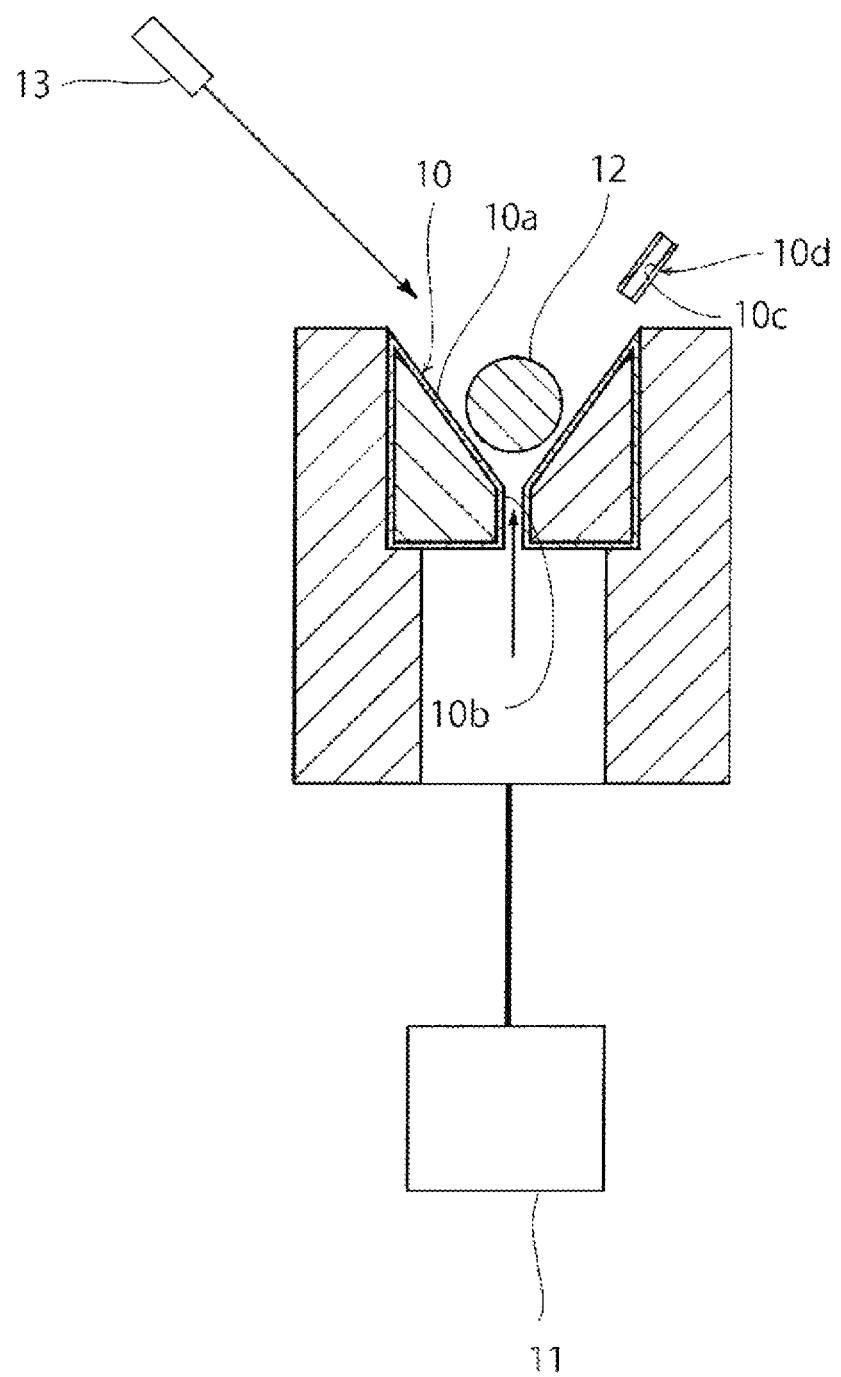

[Fig. 10]
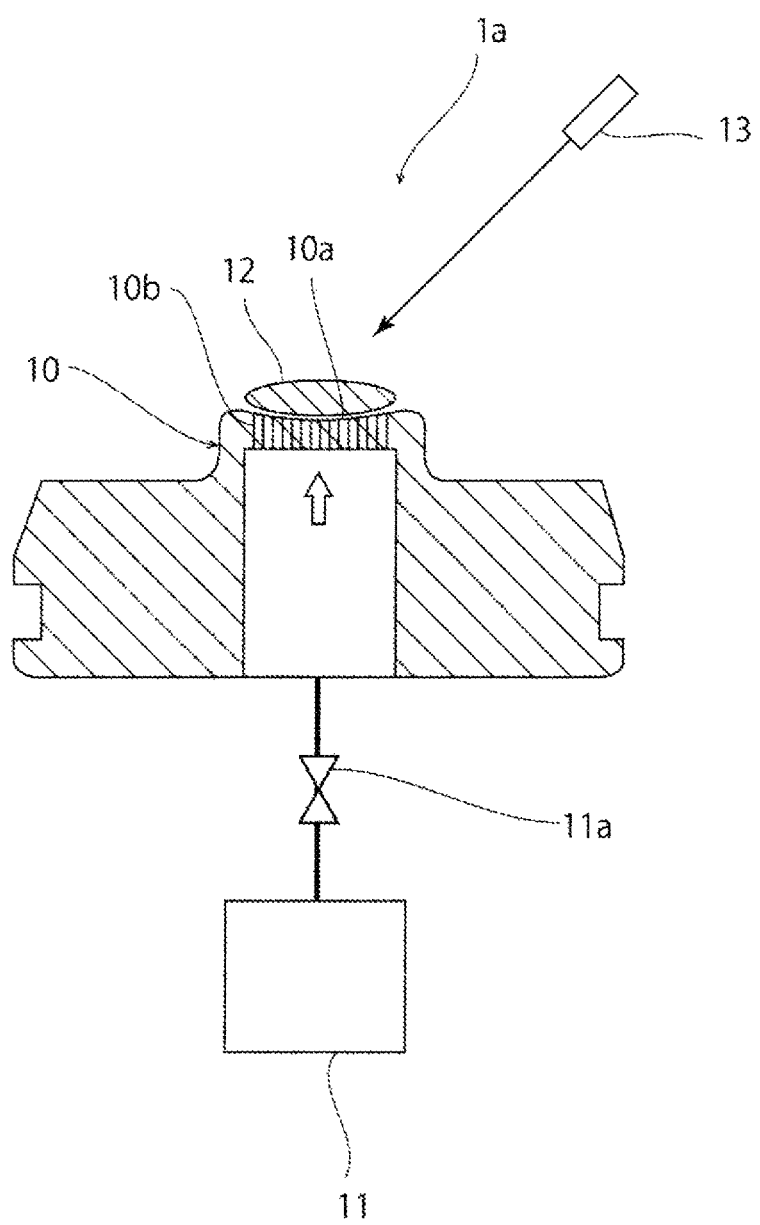

[Fig. 11]
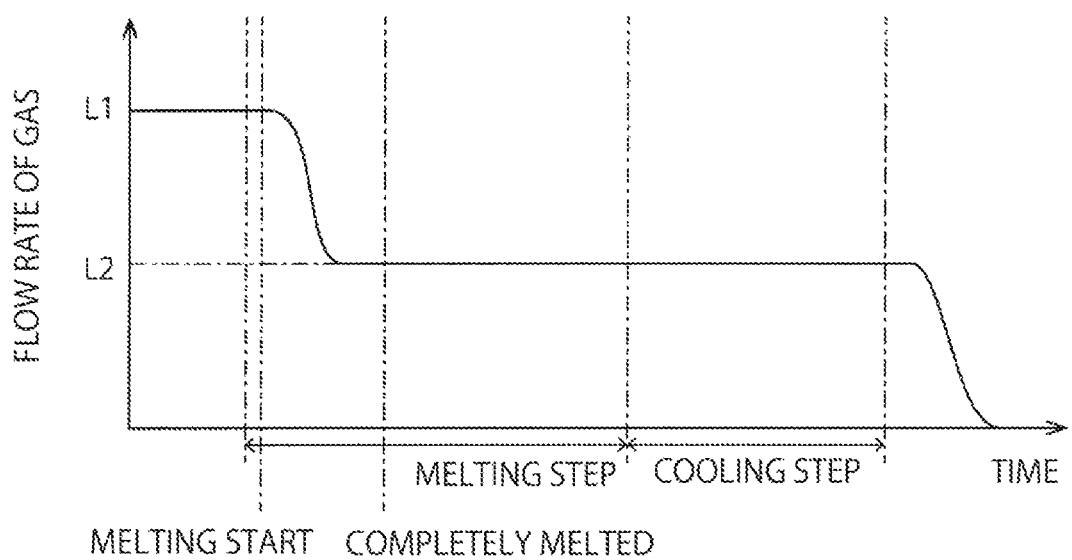

[Fig. 12]
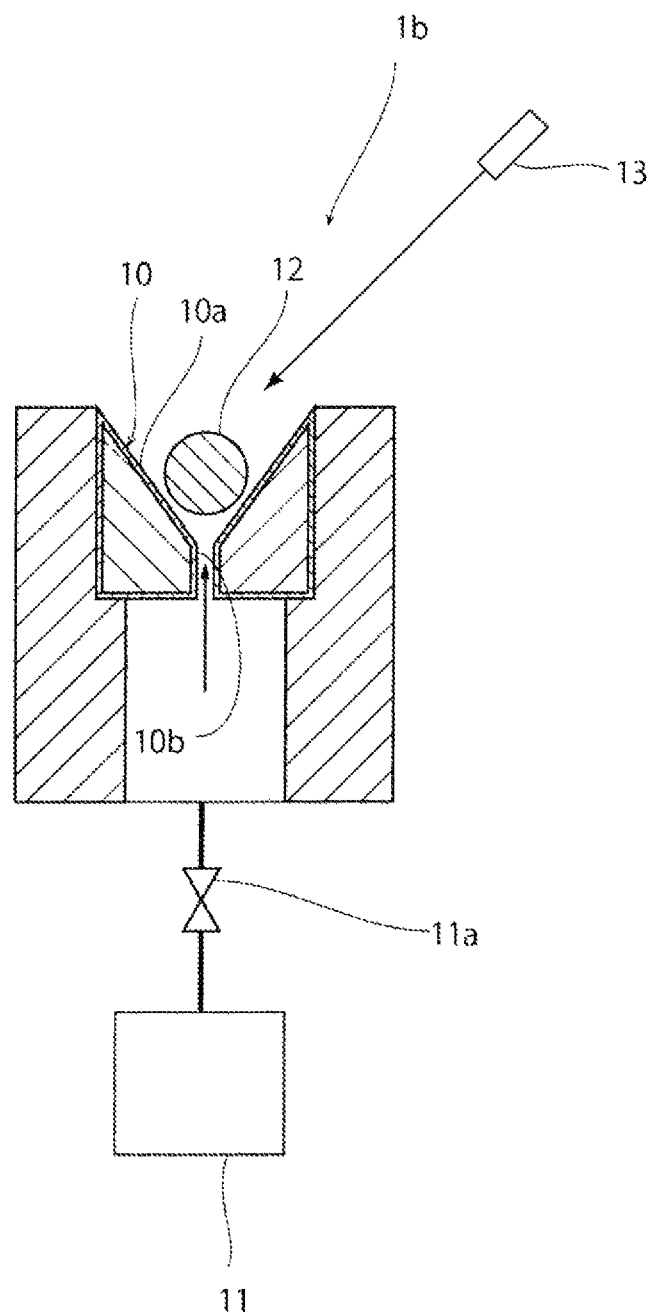

[Fig. 13]
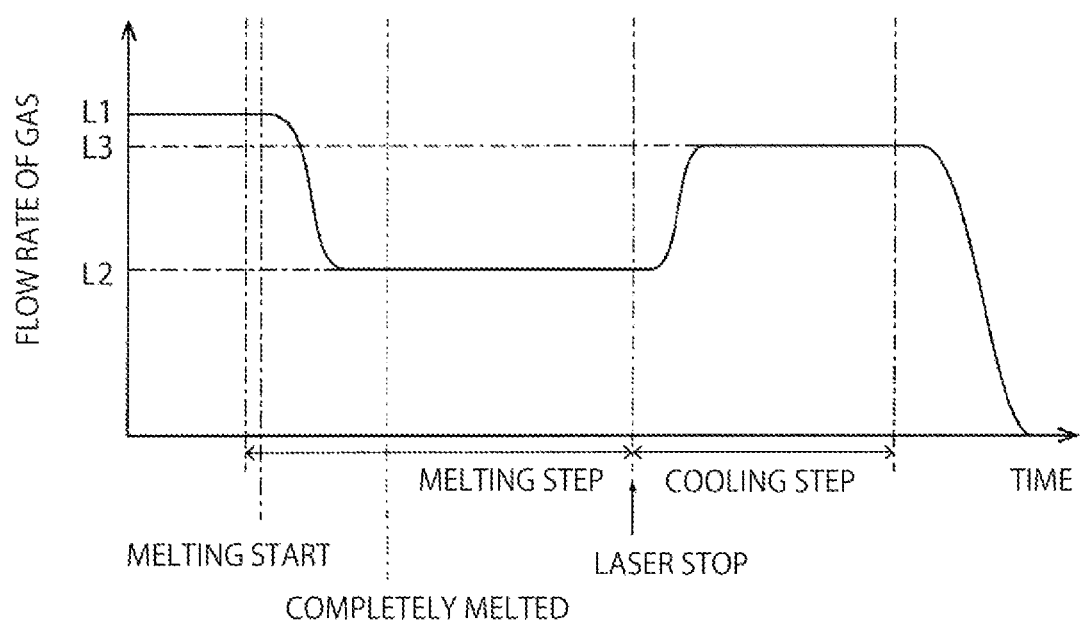

[Fig. 14]
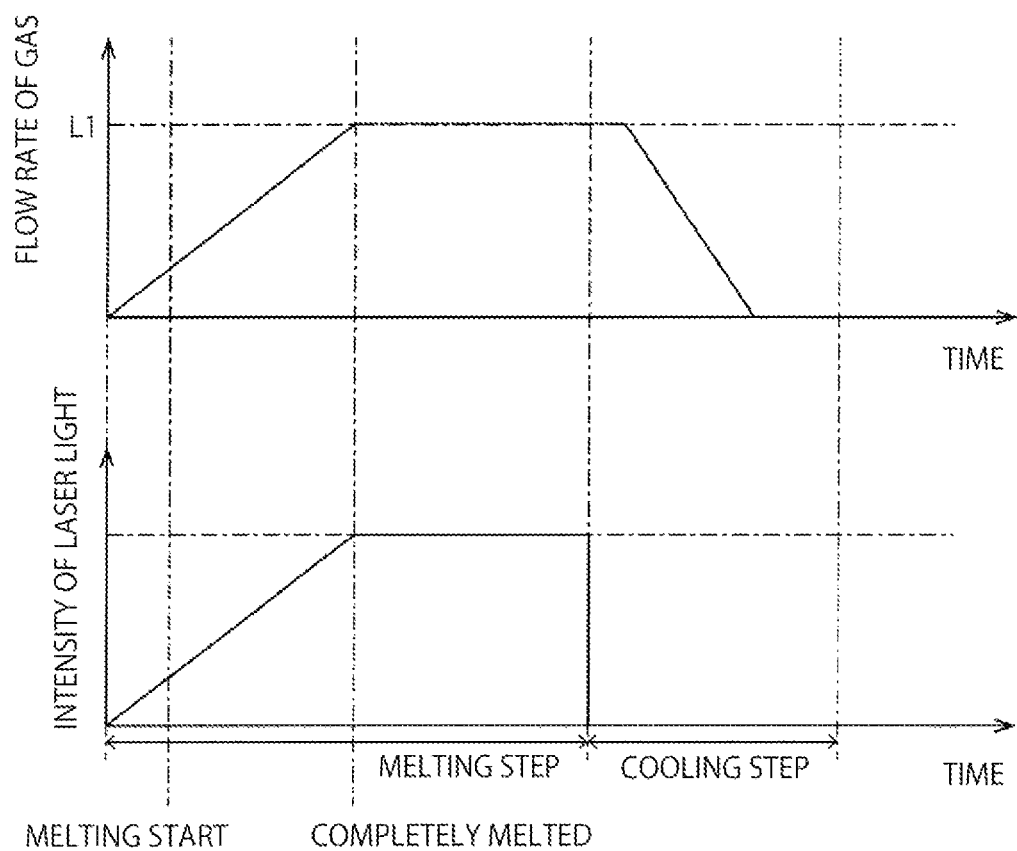

[Fig. 15]
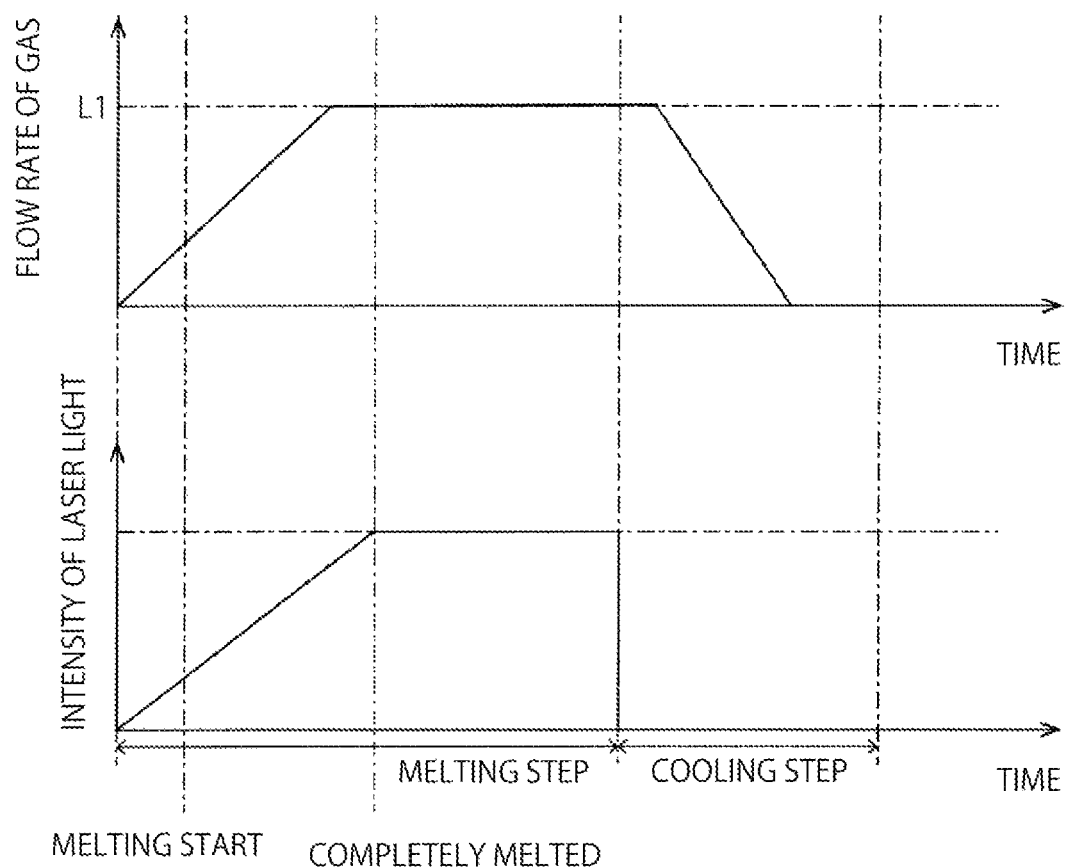

[Fig. 16]
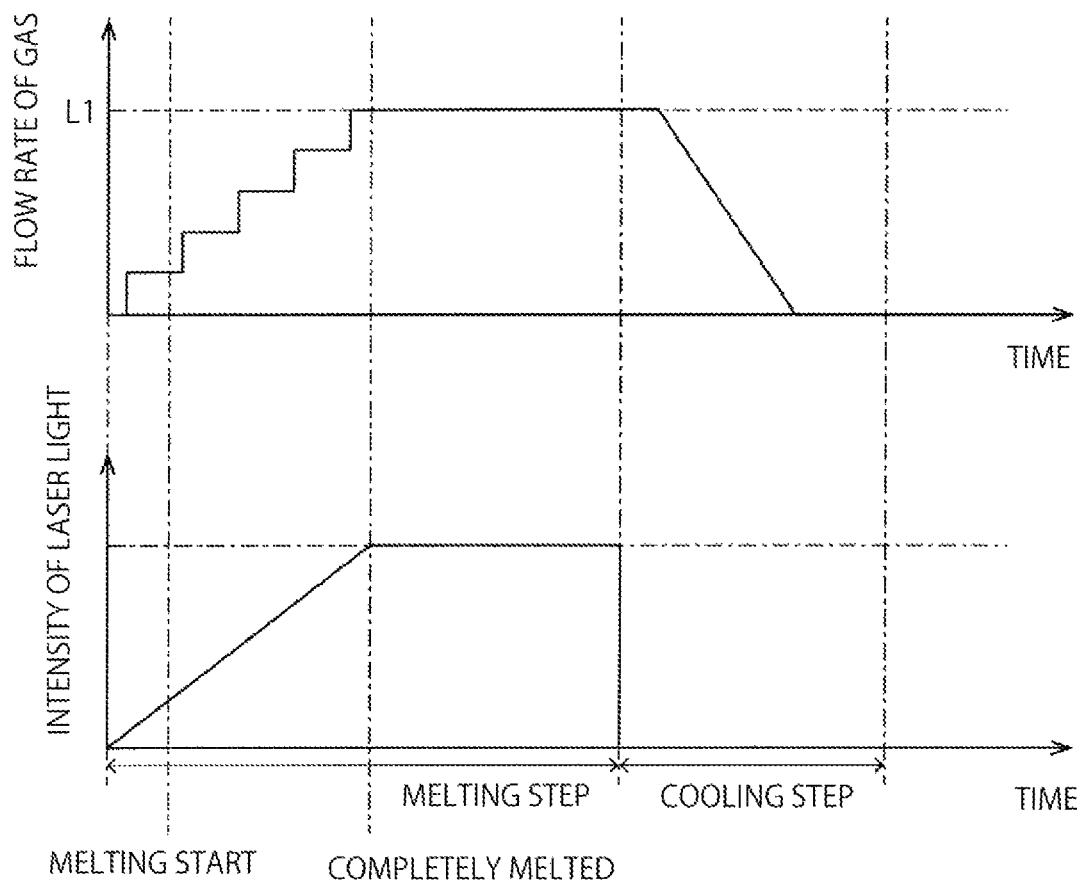

[Fig. 17]
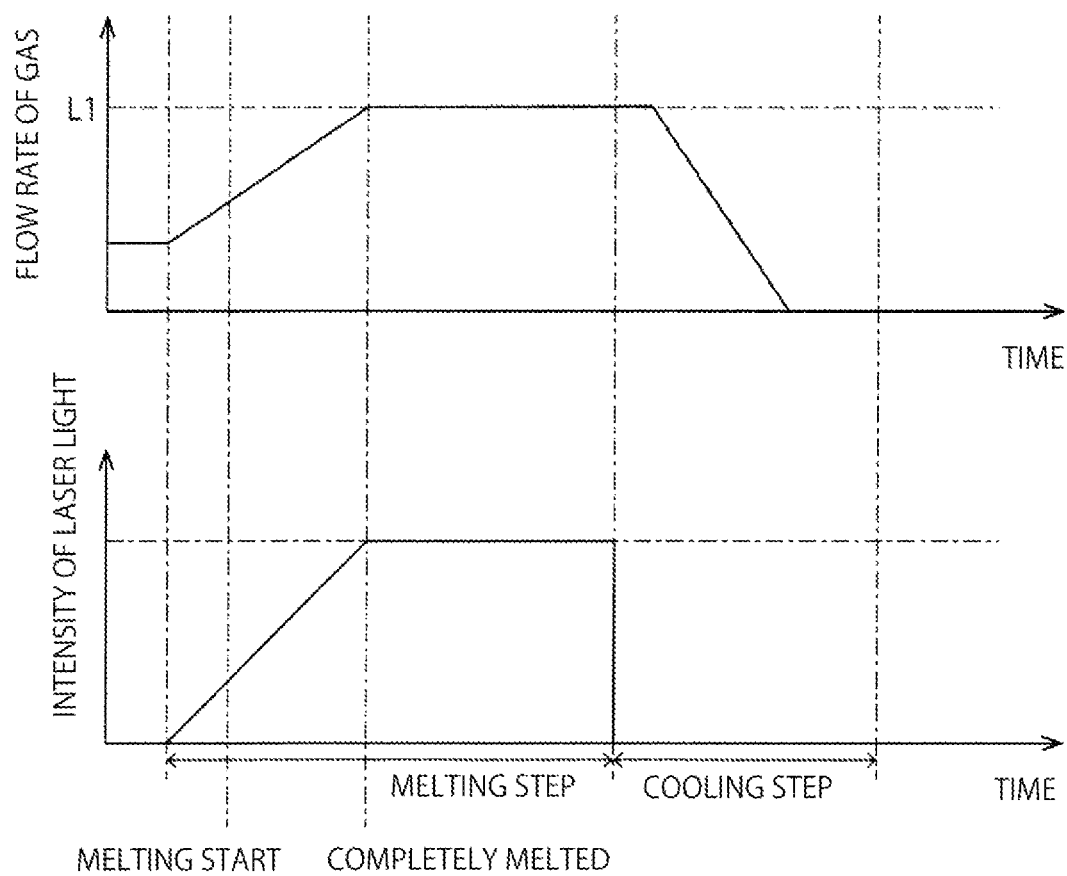

[Fig. 18]
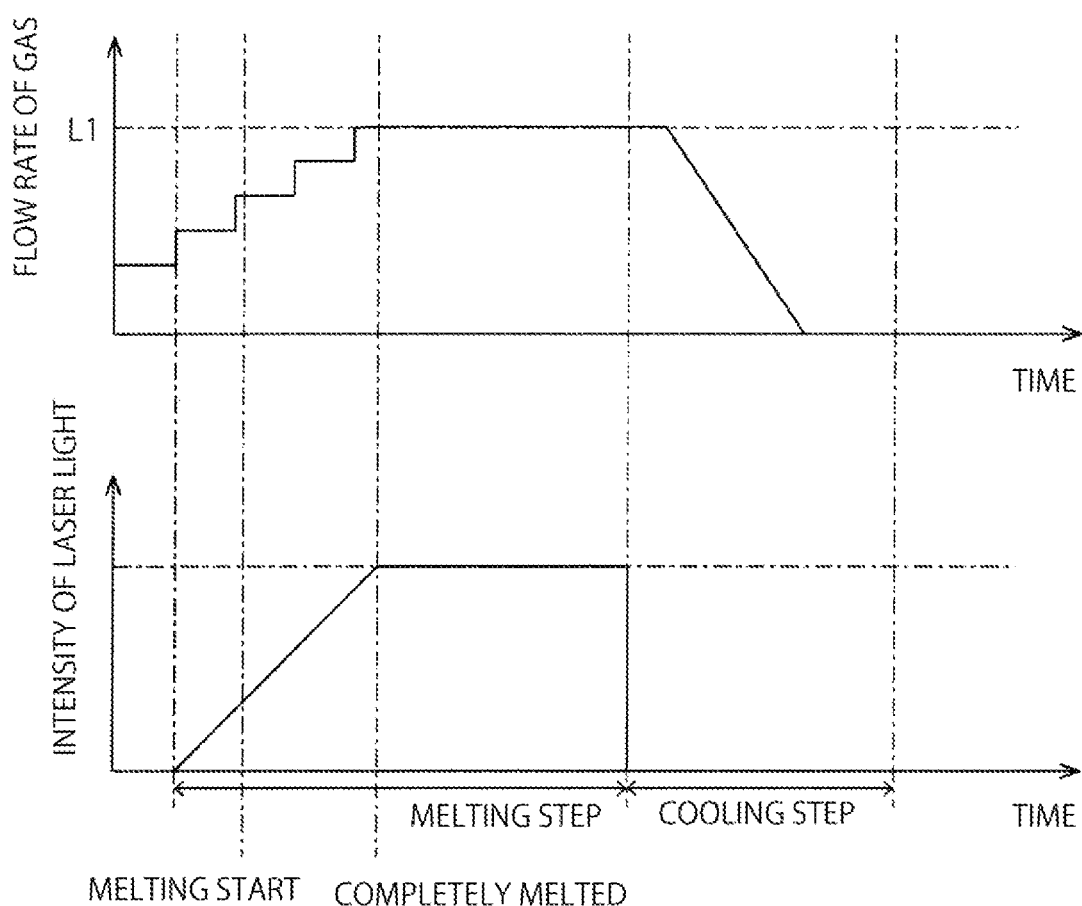

[Fig. 19]
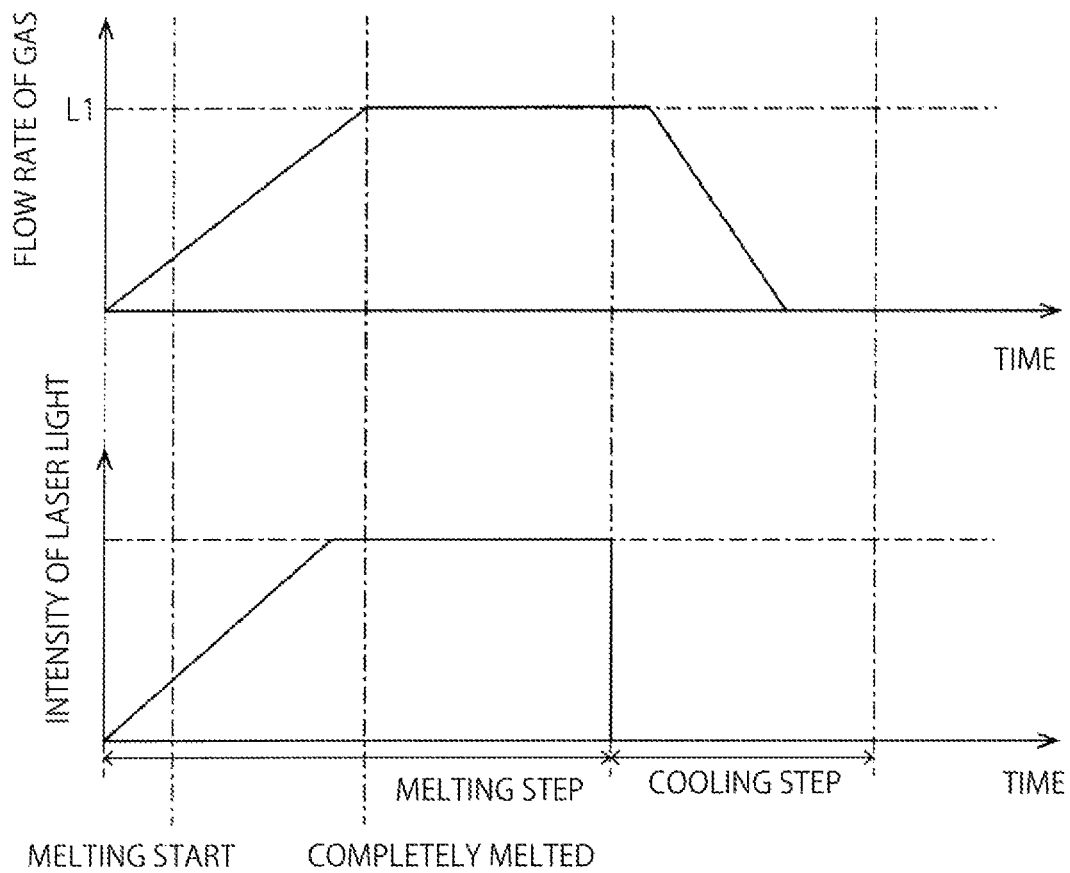

[Fig. 20]
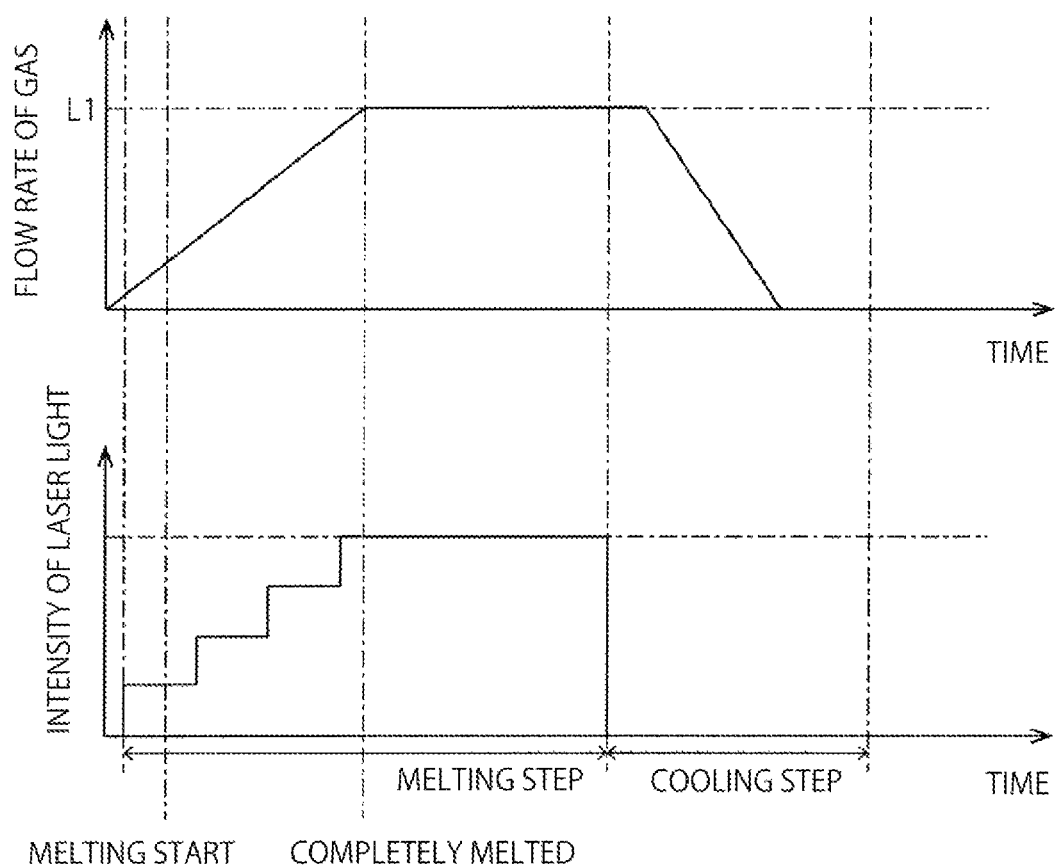

GLASS MATERIAL MANUFACTURING METHOD AND GLASS MATERIAL MANUFACTURING DEVICE

TECHNICAL FIELD

This invention relates to glass material manufacturing methods and glass material manufacturing devices.

BACKGROUND ART

In recent years, studies on containerless levitation techniques as methods for manufacturing a glass material are being conducted. For example, Patent Literature 1 describes a method in which a barium-titanium-based ferroelectric sample levitated in an aerodynamic levitation furnace is heated and melted by irradiation with laser beam and then cooled to vitrify. Whereas, in conventional methods of melting glass using a container, contact of molten glass with the wall surface of the container may cause crystals to precipitate, containerless levitation techniques can reduce the progression of crystallization due to contact of the molten glass with the wall surface of the container. Therefore, even materials that could not be vitrified by conventional manufacturing methods using a container can be vitrified by containerless levitation techniques. Hence, containerless levitation techniques are noteworthy as methods that can manufacture glass materials having novel compositions.

CITATION LIST

Patent Literature

Patent Literature 1: JP-A-2006-248801

SUMMARY OF INVENTION

Technical Problem

A challenge for containerless levitation techniques is to improve the homogeneity of a glass material. To cope with this, in the method described in Patent Literature 1, a large area of a block of glass raw material is irradiated with laser light using a plurality of lasers.

However, depending on the state of laser irradiation, temperature unevenness may occur in the block of glass raw material, which may cause volatilization of glass components or generation of unmelted matter. Furthermore, a molten glass in a levitated state obtained by melting the block of glass raw material may undesirably vibrate or oscillate to come into contact with a forming die, thus precipitating crystals. Since, as just described, the method described in Patent Literature 1 may cause precipitation of unmelted matter or crystals or undesirable volatilization, it has difficulty providing sufficiently homogeneous glass.

Moreover, when a glass material is produced by containerless levitation, there is a problem that variations in properties among lots are significant.

A principal object of the present invention is to provide a method that can manufacture a glass material having excellent homogeneity by containerless levitation. Furthermore, a principal object of the present invention is to provide a method that can manufacture a glass material having small variations in properties among lots by containerless levitation.

Solution to Problem

In a first glass material manufacturing method according to the present invention, with a block of glass raw material held levitated above a forming surface of a forming die by jetting gas through a gas jet hole opening on the forming surface, the block of glass raw material is heated and melted by irradiation with laser beam, thus obtaining a molten glass, and the molten glass is then cooled to obtain a glass material. Control gas is jetted to the block of glass raw material along a direction different from a direction of jetting of the levitation gas for use in levitating the block of glass raw material or the molten glass. By doing so, at least one of position and attitude of the block of glass raw material or the molten glass can be controlled. Thus, the block of glass raw material can be uniformly irradiated with laser light. Furthermore, the molten glass can be restrained from coming into contact with the forming surface. As a result, a glass material having excellent homogeneity can be produced.

In the first glass material manufacturing method according to the present invention, from the viewpoint of uniformly irradiating the surface of the block of glass raw material with laser light, the control gas is preferably jetted during the process of melting the block of glass raw material.

In the first glass material manufacturing method according to the present invention, from the viewpoint of restraining the precipitation of crystals due to contact of the molten glass with the forming die, the control gas is preferably jetted during the process of cooling the molten glass.

In the first glass material manufacturing method according to the present invention, the block of glass raw material may be rotated, vibrated or oscillated by jetting the control gas to the block of glass raw material. In this case, the surface of the block of glass raw material can be uniformly irradiated with laser light.

In the first glass material manufacturing method according to the present invention, positional change of the molten glass may be restricted by jetting the control gas to the molten glass. In this case, the molten glass can be effectively restrained from coming into contact with the forming die.

In the first glass material manufacturing method according to the present invention, the control gas may be jetted to the block of glass raw material or the molten glass along a horizontal direction or from an upper diagonal position.

A second glass material manufacturing method according to the present invention includes the step of heating and melting a block of glass raw material by irradiation with laser light with the block of glass raw material held levitated above a forming surface of a forming die by jetting gas through a gas jet hole opening on the forming surface, thus obtaining a molten glass, and then cooling the molten glass to obtain a glass material, wherein a flow rate of the gas through the gas jet hole after the melting of the block of glass raw material is smaller than a flow rate of the gas through the gas jet hole before the melting of the block of glass raw material. By doing so, the block of glass raw material and the molten glass obtained by melting the block of glass raw material can be stably levitated, so that the contact of the block of glass raw material and the molten glass with the forming die can be restrained. Therefore, a glass material having excellent homogeneity can be produced.

In the second glass material manufacturing method according to the present invention, the flow rate of the gas through the gas jet hole is preferably reduced before the block of glass raw material is completely melted. In this case, the molten glass can be restrained from coming into contact with the forming die and thus forming crystal nuclei or the like therein.

In the second glass material manufacturing method according to the present invention, the flow rate of the gas through the gas jet hole is preferably increased after the irradiation of laser light is stopped. By doing so, the glass material can be kept stably levitated during the cooling step.

A third glass material manufacturing method according to the present invention includes: a melting step of placing a block of glass raw material on a forming surface of a forming die, melting the block of glass raw material by irradiating the block of glass raw material with laser light while jetting gas through a gas jet hole opening on the forming surface, thus obtaining a molten glass, and then homogenizing the molten glass; and a cooling step of cooling the molten glass, wherein the irradiation with the laser light is started with the block of glass raw material in contact with the forming surface and the block of glass raw material is then levitated above the forming surface by the gas. If the block of glass raw material is irradiated with laser light with the block of glass raw material levitated, the position of the block of glass raw material varies, so that the state of laser irradiation may become unsteady among lots. As a result, variations in properties of the glass material among lots are likely to occur. This can be attributed to the fact that the local volatilization of glass components caused by irradiation with laser light and the thermal history of the block of glass raw material are different among lots. Unlike this, in the glass material manufacturing method according to the present invention, the block of glass raw material comes into contact with the forming surface at least just after the start of irradiation with laser light, which makes it less likely that the position of the block of glass raw material varies. Thus, variations among lots in the state of irradiation of the block of glass raw material with laser light can be reduced. Therefore, a glass material small in variations in properties among lots can be manufactured.

In the third glass material manufacturing method according to the present invention, the gas is preferably jetted so that the block of glass raw material starts being levitated when or before the melting of the block of glass raw material is completed. In this case, the molten glass obtained by melting the block of glass raw material can be restrained from coming into contact with the forming surface. Thus, the precipitation of crystals in the glass material can be reduced.

In the third glass material manufacturing method according to the present invention, a flow rate of the gas is preferably gradually increased until the block of glass raw material starts being levitated. In this case, the abrupt change in the flow rate of the gas jetting to the block of glass raw material can be reduced. Therefore, variations in the position of the block of glass raw material can be more effectively reduced.

In the third glass material manufacturing method according to the present invention, a flow rate of the gas is preferably stepwise increased until the block of glass raw material starts being levitated. Also in this case, the abrupt change in the flow rate of the gas jetting to the block of glass raw material can be reduced. Therefore, variations in the position of the block of glass raw material can be more effectively reduced.

In the third glass material manufacturing method according to the present invention, the gas preferably starts being jetted concurrently with the start of irradiation with the laser light. In this case, the rise in the temperature of the forming die can be reduced by the cooling effect of the gas. As a result, the molten glass can be restrained from adhering to the forming surface of the forming die.

In the third glass material manufacturing method according to the present invention, the gas may start being jetted after the start of irradiation with the laser light. In this case, variations in the position of the block of glass raw material can be more effectively reduced.

A glass material manufacturing device according to the present invention is a device for manufacturing a glass material by heating and melting a block of glass raw material by irradiation with laser beam with the block of glass raw material held levitated above a forming surface of a forming die by jetting gas through a gas jet hole opening on the forming surface, thus obtaining a molten glass, and then cooling the molten glass. The glass material manufacturing device according to the present invention includes a control gas jetting portion operable to jet control gas to the block of glass raw material along a direction different from a direction of jetting of the gas for use in levitating the block of glass raw material. In the glass material manufacturing device according to the present invention, at least one of position and attitude of the block of glass raw material or the molten glass can be controlled. Therefore, the block of glass raw material can be uniformly irradiated with laser light. Furthermore, the molten glass can be restrained from coming into contact with the forming surface. Hence, a glass material having excellent homogeneity can be produced.

Advantageous Effects of Invention

The present invention can provide a method that can manufacture a glass material having excellent homogeneity by containerless levitation. Furthermore, the present invention can provide a method that can manufacture a glass material small in variations in properties among lots by containerless levitation.

BRIEF DESCRIPTION OF DRAWINGS

FIG. 1 is a schematic cross-sectional view of a glass material manufacturing device according to a first embodiment of a first glass material manufacturing method.

FIG. 2 is a diagrammatic plan view of a portion of a forming surface in the first embodiment of the first glass material manufacturing method.

FIG. 3 is a schematic plan view showing a portion of the glass material manufacturing device according to the first embodiment of the first glass material manufacturing method.

FIG. 4 is a schematic plan view showing a portion of a glass material manufacturing device according to a second embodiment of the first glass material manufacturing method.

FIG. 5 is a schematic plan view showing a portion of a glass material manufacturing device according to a modification of the first glass material manufacturing method.

FIG. 6 is a schematic cross-sectional view of a glass material manufacturing device according to a third embodiment of the first glass material manufacturing method.

FIG. 7 is a schematic cross-sectional view of a glass material manufacturing device according to a fourth embodiment of the first glass material manufacturing method.

FIG. 8 is a schematic plan view showing a portion of the glass material manufacturing device according to the fourth embodiment of the first glass material manufacturing method.

FIG. 9 is a schematic cross-sectional view of a glass material manufacturing device according to a fifth embodiment of the first glass material manufacturing method.

FIG. 10 is a schematic cross-sectional view of a glass material manufacturing device according to a first embodiment of a second glass material manufacturing method.

FIG. 11 is a time chart of the flow rate of gas in the first embodiment of the second glass material manufacturing method.

FIG. 12 is a schematic cross-sectional view of a glass material manufacturing device according to a second embodiment of the second glass material manufacturing method.

FIG. 13 is a time chart of the flow rate of gas in a third embodiment of the second glass material manufacturing method.

FIG. 14 is a time chart of the flow rate of gas and the intensity of laser light in a first embodiment of a third glass material manufacturing method.

FIG. 15 is a time chart of the flow rate of gas and the intensity of laser light in a second embodiment of the third glass material manufacturing method.

FIG. 16 is a time chart of the flow rate of gas and the intensity of laser light in a third embodiment of the third glass material manufacturing method.

FIG. 17 is a time chart of the flow rate of gas and the intensity of laser light in a fourth embodiment of the third glass material manufacturing method.

FIG. 18 is a time chart of the flow rate of gas and the intensity of laser light in a fifth embodiment of the third glass material manufacturing method.

FIG. 19 is a time chart of the flow rate of gas and the intensity of laser light in a sixth embodiment of the third glass material manufacturing method.

FIG. 20 is a time chart of the flow rate of gas and the intensity of laser light in a seventh embodiment of the third glass material manufacturing method.

DESCRIPTION OF EMBODIMENTS

Hereinafter, a description will be given of preferred embodiments for working of the present invention. However, the following embodiments are merely illustrative. The present invention is not at all limited to the following embodiments.

Throughout the drawings to which the embodiments and the like refer, elements having substantially the same functions will be referred to by the same reference signs. The drawings to which the embodiments and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

In the following embodiments, not only normal glass materials but also glass materials having compositions that could not be vitrified by melting methods using containers, such as for example those free from a network forming oxide, can be suitably manufactured. Specifically, for example, barium titanate-based glass materials, lanthanum-niobium composite oxide-based glass materials, lanthanum-niobium-aluminum composite oxide-based glass materials, lanthanum-niobium-tantalum composite oxide-based glass materials, lanthanum-tungsten composite oxide-based glass materials, and so on can be suitably manufactured.

(1) First Glass Material Manufacturing Method

First Embodiment

FIG. 1 is a schematic cross-sectional view of a glass material manufacturing device 1 according to a first embodiment. As shown in FIG. 1, the glass material manufacturing device 1 includes a forming die 10. The forming die 10 has a curved forming surface 10a. Specifically, the forming surface 10a is spherical.

The forming die 10 has levitation gas jet holes 10b opening on the forming surface 10a. As shown in FIG. 2, in the first embodiment, a plurality of levitation gas jet holes 10b are provided. Specifically, the plurality of levitation gas jet holes 10b are arranged radially from the center of the forming surface 10a.

The forming die 10 may be made of a porous body having interconnected cells. In this case, the levitation gas jet hole 10b is formed of interconnected cells.

The levitation gas jet holes 10b are connected to a gas supply mechanism 11, such as a compressed gas cylinder. Gas is supplied from this gas supply mechanism 11 via the levitation gas jet holes 10b to the forming surface 10a.

No particular limitation is placed on the type of the gas. The gas may be, for example, air or oxygen or may be inert gas, such as nitrogen, argon or helium gas.

In manufacturing a glass material using the manufacturing device 1, first, a block 12 of glass raw material is placed on the forming surface 10a. The block 12 of glass raw material may be, for example, one obtained by forming raw material powders for a glass material into a single piece by press molding or so on. The block 12 of glass raw material may be a sintered body obtained by forming raw material powders for a glass material into a single piece by press molding or so on and then sintering the single piece. Alternatively, the block 12 of glass raw material may be an aggregate of crystals having the same composition as a desired glass composition.

No particular limitation is placed on the shape of the block 12 of glass raw material. The block 12 of glass raw material may have, for example, a lens-like, spherical, cylindrical, polygonal, cuboidal, or oval-spherical shape.

Next, gas is jetted out through the levitation gas jet holes 10b, thus levitating the block 12 of glass raw material above the forming surface 10a. In other words, the block 12 of glass raw material is held, out of contact with the forming surface 10a, in the air. In this state, the block 12 of glass raw material is irradiated with laser light from a laser applicator 13. Thus, the block 12 of glass raw material is heated and melted, thus obtaining a molten glass. Thereafter, the molten glass is cooled, so that a glass material can be obtained. The jetting of the levitation gas is preferably continued until the temperature of the glass material reaches at least below the softening point, preferably below the glass transition point, thus restraining the block 12 of glass raw material, the molten glass or the glass material from coming into contact with the forming surface 10a.

As shown in FIGS. 1 and 3, the forming die 10 includes a control gas jet hole 10c forming the control gas jetting portion. The control gas jet hole 10c extends in a direction different from the direction of extension of the levitation gas jet holes 10b. Specifically, whereas the levitation gas jet holes 10b extend along the vertical direction, the control gas jet hole 10c extends along the horizontal direction. The control gas jet hole 10c is provided to open to the block 12 of glass raw material levitated above the forming surface 10a.

In the first embodiment, with the block 12 of glass raw material held levitated, control gas is jetted through the control gas jet hole 10c. As described above, the direction of extension of the control gas jet hole 10c and the direction of extension of the levitation gas jet holes 10b are different from each other. Therefore, the direction of jetting of the control gas jetting through the control gas jet hole 10c is different from the direction of jetting of the levitation gas through the levitation gas jet holes 10b. By the control gas jetting through the control gas jet hole 10c, at least one of position and attitude of the block 12 of glass raw material or molten glass being levitated is controlled.

By employing the above structure, it becomes possible to optimize the state of irradiation of laser light, so that the precipitation of unmelted matter or crystals and the occurrence of undesirable volatilization can be restrained. Therefore, a homogeneous glass material can be produced. More specifically, depending on the state of irradiation of the block of glass raw material with laser light, temperature unevenness may occur in the block of glass raw material. If part of the block of glass raw material is excessively heated, undesirable volatilization may occur, which may cause problems of striae, composition deviation, and so on. On the other hand, if the temperature of part of the block of glass raw material is too low, unmelted matter may be formed in a produced glass material. Furthermore, if the molten glass in a levitated state undesirably vibrates or oscillates to come into contact with the forming die, crystals may be precipitated in a produced glass material. To cope with these problems, as described above, in the first embodiment, control gas is jetted to the block 12 of glass raw material or the molten glass. Thus, at least one of position and attitude of the block 12 of glass raw material or molten glass in a levitated state can be controlled.

Specifically, by jetting the control gas during the process of melting the block 12 of glass raw material, the block 12 of glass raw material can be rotated or can be vibrated or oscillated without coming into contact with the forming die 10. Thus, the surface of the block 12 of glass raw material can be uniformly irradiated with laser light. This makes it easier to uniformly heat the block 12 of glass raw material. As a result, the occurrence of undesirable volatilization due to part of the block 12 of glass raw material reaching an excessively high temperature and the generation of unmelted matter due to part of the block 12 of glass raw material reaching an excessively low temperature can be restrained.

Furthermore, by jetting the control gas during the process of cooling the molten glass obtained by melting the block 12 of glass raw material, the positional change of the molten glass can be restricted. Thus, the contact of the molten glass with the forming die 10 can be restrained. As a result, the precipitation of crystals in a produced glass material can be restrained.

From the viewpoint of more effectively reducing the positional change of the molten glass, the control gas is preferably jetted so that the molten glass rotates and more preferably jetted so that the molten glass rotates on a central axis passing through the molten glass (for example, a central vertical axis thereof).

Hereinafter, a description will be given of other exemplary preferred embodiments of the present invention. In the descriptions below, elements having functions substantially in common with the first embodiment will be referred to by the common reference signs and further explanation thereof will be omitted.

Second Embodiment

FIG. 4 is a schematic plan view showing a portion of the glass material manufacturing device according to a second embodiment.

As shown in FIG. 3, a description in the first embodiment has been given of an example where a single control gas jet hole 10c is provided. However, the present invention is not limited to this configuration.

As shown in FIG. 4, the second embodiment is different from the first embodiment in that a plurality of control gas jet holes 10c are provided. Specifically, the plurality of control gas jet holes 10c are provided radially from the center of the forming surface 10a in plan view. The plurality of control gas jet holes 10c are provided at approximately regular intervals along the circumferential direction. By providing the plurality of control gas jet holes 10c in this manner, the positional change of the molten glass can be more effectively restricted. Accordingly, the contact of the molten glass with the forming die 10 can be more effectively restrained.

Furthermore, by providing the plurality of control gas jet holes 10c along the circumferential direction, the rotation, vibration or oscillation of the block 12 of glass raw material can be promoted. Thus, the surface of the block 12 of glass raw material can be more uniformly irradiated with laser light.

From the viewpoint of further promoting the rotation of the block 12 of glass raw material, as shown in FIG. 5, the control gas jet holes 10c are preferably provided to extend along a direction different from the radial direction of the forming surface 10a of the forming die 10.

Third Embodiment

FIG. 6 is a schematic cross-sectional view of a glass material manufacturing device according to a third embodiment.

In the first and second embodiments, a description has been given of an example where control gas is jetted along the horizontal direction. However, the present invention is not limited to this.

As shown in FIG. 6, the third embodiment is different from the first and second embodiments in that a control gas jet nozzle 10d having a control gas jet hole 10c extends diagonally downward to the center of the forming surface 10a of the forming die 10. Thus, control gas is jetted to the block 12 of glass raw material from an upper diagonal position. In this case, the block 12 of glass raw material can be rotated, for example, on a central horizontal axis thereof.

If the block 12 of glass raw material is not rotated, the top surface of the block 12 of glass raw material is heated but the bottom surface thereof is cooled by the levitation gas jetted through the levitation gas jet holes 10b, which makes the block 12 of glass raw material likely to cause temperature unevenness. Therefore, undesirable volatilization or the generation of unmelted matter may occur. Unlike this, since in the third embodiment the block 12 of glass raw material is rotated on a central horizontal axis thereof, the occurrence of temperature unevenness in the block 12 of glass raw material can be reduced.

Fourth Embodiment

FIG. 7 is a schematic cross-sectional view of a glass material manufacturing device according to a fourth embodiment. FIG. 8 is a schematic plan view showing a portion of the glass material manufacturing device according to the fourth embodiment.

In the fourth embodiment, a plurality of control gas jet nozzles 10d having their respective control gas jet holes 10c are arranged at approximately regular intervals along the circumferential direction. Each control gas jet nozzle 10d extends along the vertical direction. Therefore, control gas is jetted along an opposite (downward) direction to the (upward) direction of jetting of the levitation gas. Because the plurality of control gas jet nozzles 10d are arranged so that control gas jetted from their respective control gas jet nozzles 10d hits the side surface of the block 12 of glass raw material, the positional change of the molten glass obtained by melting the block 12 of glass raw material can be effectively restricted.

Fifth Embodiment

FIG. 9 is a schematic cross-sectional view of a glass material manufacturing device according to a fifth embodiment.

In the first to fourth embodiments, a description has been given of an example where a plurality of levitation gas jet holes 10b open on the forming surface 10a. However, the present invention is not limited to this configuration. For example, like a glass material manufacturing device shown in FIG. 9, a single gas jet hole 10b opening at the center of the forming surface 10a may be provided. Even with a single levitation gas jet hole 10b, the block 12 of glass raw material or the molten glass can be held above the forming surface 10a of the forming die 10 by levitation gas jetted through the levitation gas jet hole 10b connected to a gas supply mechanism 11.

(2) Second Glass Material Manufacturing Method

First Embodiment

FIG. 10 is a schematic cross-sectional view of a glass material manufacturing device 1a according to a first embodiment. As shown in FIG. 10, the glass material manufacturing device 1a includes a forming die 10. The forming die 10 has a curved forming surface 10a. Specifically, the forming surface 10a is spherical.

The forming die 10 has gas jet holes 10b opening on the forming surface 10a. Specifically, in this embodiment, a plurality of gas jet holes 10b are provided. More specifically, like the first embodiment (FIG. 2) of the first glass material manufacturing method, the plurality of gas jet holes 10b are arranged radially from the center of the forming surface 10a.

The forming die 10 may be made of a porous body having interconnected cells. In this case, the gas jet hole 10b is formed of interconnected cells.

The gas jet holes 10b are connected to a gas supply mechanism 11, such as a compressed gas cylinder. Gas is supplied from this gas supply mechanism 11 via the gas jet holes 10b to the forming surface 10a. A gas flow regulating portion 11a is provided between the gas supply mechanism 11 and the gas jet holes 10b. By this gas flow regulating portion 11a, the flow rate of gas to be jetted out through the gas jet holes 10b can be controlled. The gas flow regulating portion 11a can be formed of, for example, a valve.

As the gas, the same type as that used in the first embodiment of the first glass material manufacturing method can be used.

In manufacturing a glass material using the manufacturing device 1a, first, a block 12 of glass raw material is placed on the forming surface 10a. The form and shape of the block 12 of glass raw material are the same as in the first embodiment of the first glass material manufacturing method.

Next, gas is jetted out through the gas jet holes 10b, thus levitating the block 12 of glass raw material above the forming surface 10a. In other words, the block 12 of glass raw material is held, out of contact with the forming surface 10a, in the air. In this state, the block 12 of glass raw material is irradiated with laser light from a laser applicator 13. Thus, the block 12 of glass raw material is heated and melted to make it vitrifiable, thereby obtaining a molten glass. Thereafter, the molten glass is cooled, so that a glass material can be obtained. During the step of heating and melting the block 12 of glass raw material and the step of cooling the molten glass and in turn the glass material at least to below the softening point, at least the jetting of gas is preferably continued to restrain the contact of the block 12 of glass raw material, the molten glass or the glass material with the forming surface 10a. Note that in the description below the step of irradiating the block 12 of glass raw material or a melt of the block 12 of glass raw material with laser light is referred to as a "melting step". Therefore, the melting step can include: the process of irradiating the block 12 of glass raw material with laser light to melt the block 12 of glass raw material; and the process of irradiating a molten glass obtained by melting the block 12 of glass raw material with laser light to homogenize the molten glass.

The inventors have found, as a result of intensive studies, that if the flow rate of gas during the melting step is constant, the levitated state of the block 12 of glass raw material or the molten glass changes. Specifically, for example, if the flow rate of gas is set such that the block 12 of glass raw material is stably levitated, the flow rate of gas is too large, which may cause the molten glass to be excessively vibrated or oscillated and thereby be likely to come into contact with the forming die 10. On the other hand, if the flow rate of gas is set such that the molten glass is stably levitated, the flow rate of gas is too small, which may make the block 12 of glass raw material difficult to levitate sufficiently. If the levitation of the block 12 of glass raw material is insufficient, a melted portion of the block 12 of glass raw material may come into contact with the forming die 10 and thereby become a starting point of crystallization. Furthermore, because the block 12 of glass raw material is less likely to change in position, a particular portion thereof is likely to be locally heated, which may cause a composition deviation due to evaporation of a glass component.

In this embodiment, the gas flow regulating portion 11a makes the flow rate of gas through the gas jet holes 10b after the melting of the block 12 of glass raw material smaller than the flow rate of gas through the gas jet holes 10b before the melting of the block 12 of glass raw material. Therefore, both the block 12 of glass raw material and the molten glass obtained by melting the block 12 of glass raw material can be suitably levitated. Thus, the block 12 of glass raw material and the molten glass can be restrained from coming into contact with the forming die 10.

Specifically, in this embodiment, as shown in FIG. 11, the flow rate of gas jetted to the block 12 of glass raw material before the start of the melting step is set at L1. The flow rate of gas jetted to the molten glass after the block 12 of glass raw material has been completely melted is set at L2 smaller than L1. Thereafter, the jetting of gas through the gas jet holes 10b is stopped. By doing so, the generation of crystals and nuclei in the molten glass can be restrained. Therefore, a homogeneous glass material can be produced.

The flow rate of gas is preferably reduced from L1 to L2 before the block 12 of glass raw material has been completely melted, and the flow rate of gas is preferably reduced from L1 to L2 in a period from the time when the melting of the block 12 of glass raw material starts to the time when the block 12 of glass raw material has been completely melted into a molten glass. By doing so, the molten glass can be more effectively restrained from coming into contact with the forming die 10.

From the viewpoint of obtaining a more homogeneous glass material, L1/L2 is preferably 1.05 to 1.5 and more preferably 1.1 to 1.2. The flow rates L1 and L2 can be appropriately set depending on, for example, the shape or dimension of the block 12 of glass raw material or the shape or other features of the gas jet holes 10b and can be set at, for example, about 0.5 L/min to about 15 L/min.

Second Embodiment

FIG. 12 is a schematic cross-sectional view of a glass material manufacturing device 1a according to a second embodiment.

In the first embodiment, a description has been given of an example where a plurality of gas jet holes 10b open on the forming surface 10a. However, the present invention is not limited to this configuration. For example, like a glass material manufacturing device 1b shown in FIG. 12, a single gas jet hole 10b opening at the center of the forming surface 10a may be provided.

Third Embodiment

FIG. 13 is a time chart of the flow rate of gas in a third embodiment. As shown in FIG. 13, in this embodiment, the flow rate of gas through the gas jet holes 10b is increased in the cooling step after the irradiation of laser light is stopped. Specifically, in the cooling step after the irradiation of laser light is stopped, the flow rate of gas is increased from a flow rate L2 in the melting step to a flow rate L3 larger than L2. By doing so, the formed glass material can be kept stably levitated in the cooling step. For example, if the flow rate of gas remains at the flow rate L2 even in the cooling step, the formed glass material may not stably be levitated. This can be attributed to the fact that the glass material formed by cooling is difficult to levitate because it has a higher density and has a smaller surface area and therefore a smaller area exposed to gas than the mass of glass in a melted state. The ratio of the flow rate L3 to the flow rate L2 is preferably 1.05 to 1.5 and more preferably 1.1 to 1.2. Specifically, the flow rate L3 varies depending on the shape, dimension or other features of the block 12 of glass raw material, but is preferably, for example, about 1 L/min to about 15 L/min.

The flow rate L3 is more preferably less than the flow rate L1. The reason for this is that while generally the block 12 of glass raw material is porous or has a distorted shape, the formed glass material is solid and has a neat shape, thereby requiring a less flow rate of gas for levitation. Specifically, the ratio of the flow rate L3 to the flow rate L1 is preferably 0.98 or less and more preferably 0.95 or less.

(3) Third Glass Material Manufacturing Method

First Embodiment

In this embodiment, like the first embodiment of the second glass material manufacturing method, a glass material is manufactured using the manufacturing device 1a shown in FIG. 10.

As the gas, the same type as that used in the first embodiment of the first glass material manufacturing method can be used.

Next, a description will be given of a glass material manufacturing method using the manufacturing device 1a. What is performed in this embodiment are: a melting step of placing a block 12 of glass raw material on the forming surface 10a of the forming die 10, melting the block 12 of glass raw material by irradiating the block 12 of glass raw material with laser light from the applicator 13 while jetting gas through the gas jet holes 10a opening on the forming surface 10a, thus obtaining a molten glass, and then homogenizing the molten glass; and a cooling step of cooling the molten glass to obtain a glass material. In the melting step, the irradiation with the laser light is started with the block 12 of glass raw material in contact with the forming surface 10a and the block 12 of glass raw material is then levitated above the forming surface 10a by the gas.

The form and shape of the block 12 of glass raw material are the same as in the first embodiment of the first glass material manufacturing method.

FIG. 14 is a time chart of the flow rate of gas and the intensity of laser light in the first embodiment. In this embodiment, as shown in FIG. 14, the gas starts being jetted concurrently with the start of irradiation with laser light. In this case, just after the block 12 of glass raw material starts being irradiated with laser light, the flow rate of gas is controlled so that the block 12 of glass raw material is in contact with the forming surface 10a. Specifically, after the gas start being jetted concurrently with the start of irradiation with laser light, the flow rate of gas is gradually increased and then, upon completion of the melting of the block 12 of glass raw material and turning thereof into a molten glass, controlled to reach a flow rate L1 suitable to stably levitate the molten glass. Thereafter, this state is maintained for a given time for glass homogenization. Then, the irradiation with laser light is stopped and the molten glass is cooled, so that a glass material can be obtained.

It is preferred that until the molten glass and in turn the glass material reaches at least below the softening point after the completion of melting of the block 12 of glass raw material, at least the jetting of gas should be continued to restrain the contact of the molten glass or the glass material with the forming surface 10a. Furthermore, in stopping the jetting of gas, the flow rate of gas is preferably gradually reduced.

The flow rate L1 can be appropriately set depending on, for example, the weight or volume of the block 12 of glass raw material or the shape, dimension or other features of the gas jet holes 10b. The flow rate L1 can be set at, for example, about 0.5 L/min to about 15 L/min.

Note that in this embodiment the step of irradiating the block 12 of glass raw material or the molten glass obtained by melting the block 12 of glass raw material with laser light is referred to as a "melting step". Therefore, the melting step can include: the process of irradiating the block 12 of glass raw material with laser light to melt the block 12 of glass raw material; and the process of irradiating a molten glass obtained by melting the block 12 of glass raw material with laser light to homogenize the molten glass.

As thus far described, in this embodiment, just after the block 12 of glass raw material starts being irradiated with laser light, the block 12 of glass raw material is in contact with the forming surface 10a. Particularly, in this embodiment, during a period from just after the start of irradiation of the block 12 of glass raw material with laser light to the completion of melting of the block 12 of glass raw material, the block 12 of glass raw material is in contact with the forming surface 10a and, therefore, less likely to vary in position. For this reason, the state of irradiation of the block 12 of glass raw material with laser light can be substantially similar among lots. Hence, a glass material small in variations in properties among lots can be manufactured.

In this embodiment, the gas starts being jetted concurrently with the start of irradiation with laser light. By doing so, the rise in the temperature of the forming die 10 can be reduced by the cooling effect of the gas. As a result, the molten glass can be restrained from fusion bonding to the forming surface 10a of the forming die 10.

In this embodiment, the flow rate of the gas is gradually increased to a flow rate L1 at which the block 12 of glass raw material becomes levitated. Therefore, the abrupt change in the flow rate of the gas jetting to the block of glass raw material can be reduced, so that sudden movements of the block 12 of glass raw material (or the molten glass) can be effectively restrained.

In this embodiment, after the melting of the block 12 of glass raw material is completed, gas is jetted so that the molten glass is levitated. Therefore, the molten glass can be restrained from coming into contact with the forming surface 10a and thus being crystallized. Hence, a glass material having more excellent homogeneity can be manufactured.

Second Embodiment

FIG. 15 is a time chart of the flow rate of gas and the intensity of laser light in a second embodiment.

In the first embodiment, a description has been given of an example where the flow rate of gas reaches L1 when the melting of the block 12 of glass raw material is completed. However, the present invention is not limited to this. For example, as shown in FIG. 15, after the melting of the block 12 of glass raw material starts and before the block 12 of glass raw material is completely melted, the gas may be jetted so that the flow rate of the gas reaches L1. In this case, a melted portion of the block 12 of glass raw material can be restrained from coming into contact with the forming surface 10a and thus precipitating crystals.

Third Embodiment

FIG. 16 is a time chart of the flow rate of gas and the intensity of laser light in a third embodiment.

In the first and second embodiments, a description has been given of an example where the flow rate of gas is gradually increased until the block 12 of glass raw material starts being levitated. However, the present invention is not limited to this. For example, as shown in FIG. 16, the flow rate of gas may be stepwise increased until the block 12 of glass raw material starts being levitated. Also in this case, the abrupt change in the flow rate of gas jetting to the block 12 of glass raw material can be reduced.

Furthermore, in the first and second embodiments, a description has been given of an example where the gas starts being jetted concurrently with the start of irradiation with laser light. However, the present invention is not limited to this. For example, as shown in FIG. 16, the gas may start being jetted after the start of irradiation with the laser light. In this case, variations in the position of the block 12 of glass raw material can be more effectively reduced.

Fourth and Fifth Embodiments

FIG. 17 is a time chart of the flow rate of gas and the intensity of laser light in a fourth embodiment. FIG. 18 is a time chart of the flow rate of gas and the intensity of laser light in a fifth embodiment.

In the first and second embodiments, a description has been given of an example where gas starts being jetted concurrently with the start of irradiation with laser light. Furthermore, in the third embodiment, a description has been given of an example where the gas starts being jetted after the start of irradiation with laser light. However, the present invention is not limited to these. For example, as shown in FIGS. 17 and 18, before the block 12 of glass raw material starts being irradiated with laser light, the gas may be jetted at such a flow rate that the block 12 of glass raw material can be held in contact with the forming surface 10a. In this case, the rise in the temperature of the forming die 10 can be more effectively reduced.

Sixth Embodiment

FIG. 19 is a time chart of the flow rate of gas and the intensity of laser light in a sixth embodiment.

In the first to fifth embodiments, a description has been given of an example where the intensity of laser light is gradually increased so that the melting of the block 12 of glass raw material is completed at the time when the intensity of laser light reaches the maximum. However, the present invention is not limited to this. For example, as shown in FIG. 19, the intensity of laser light may be gradually increased to a maximum intensity so that the melting of the block 12 of glass raw material is completed after the intensity of laser light reaches the maximum.

Seventh Embodiment

FIG. 20 is a time chart of the flow rate of gas and the intensity of laser light in a seventh embodiment.

In the first to sixth embodiments, a description has been given of an example where the intensity of laser light is gradually increased to a maximum intensity. However, the present invention is not limited to this. For example, as shown in FIG. 20, the intensity of laser light may be stepwise increased from zero to the maximum intensity.

Eighth Embodiment

In the first to seventh embodiments, a description has been given of an example where a plurality of gas jet holes 10b open on the forming surface 10a of the forming die 10. However, the present invention is not limited to this configuration. For example, like the glass material manufacturing device 1b shown in FIG. 12, a single gas jet hole 10b opening at the center of the forming surface 10a may be provided.

REFERENCE SIGNS LIST 1, 1a, 1b manufacturing device
10 forming die
10a forming surface
10b levitation gas jet hole
10c control gas jet hole
10d control gas jet nozzle
11 gas supply mechanism
11a gas flow regulating portion
12 block of glass raw material
13 laser applicator

The invention claimed is:
1. A glass material manufacturing method comprising:
heating and melting a block of glass raw material by irradiation with laser light with the block of glass raw material held levitated above a forming surface of a forming die by jetting gas through a gas jet hole opening on the forming surface, thus obtaining a molten glass, and then cooling the molten glass to obtain a glass material, wherein
a flow rate of the gas through the gas jet hole after completely melting the block of glass raw material is smaller than a flow rate of the gas through the gas jet hole before the melting of the block of glass raw material by reducing the flow rate of the gas through the gas jet hole in a period from a time when the melting of the block of glass raw material starts to a time when the block of glass raw material has been completely melted.

2. The glass material manufacturing method according to claim 1, wherein the flow rate of the gas through the gas jet hole is increased after the irradiation of laser light is stopped.

3. The glass material manufacturing method according to claim 1, wherein, when the flow rate of the gas through the gas jet hole before the start of the melting of the block of glass raw material is L1, and the flow rate of the gas through the gas jet hole after the block of glass raw material has been completely melted is L2, L1/L2 is 1.05 to 1.5.

4. The glass material manufacturing method according to claim 1, wherein, when the flow rate of the gas through the gas jet hole after completely melting the block of glass raw material is L2, and a flow rate of the gas through the gas jet hole during the cooling after the irradiation of laser light is stopped is L3, L3/L2 is 1.05 to 1.5.

5. The glass material manufacturing method according to claim 1, wherein, when the flow rate of the gas through the gas jet hole before the start of the melting of the block of glass raw material is L1, and a flow rate of the gas through the gas jet hole during the cooling after the irradiation of laser light is stopped is L3, L3 is less than L1.

* * * * *